United States Patent
Takashima et al.

(10) Patent No.: US 6,592,110 B2
(45) Date of Patent: Jul. 15, 2003

(54) SWITCHABLE LIQUID-FILLED VIBRATION ABSORBING MOUNT

(75) Inventors: Yukio Takashima, Osaka (JP); Masashi Takaoka, Osaka (JP); Yosei Kodama, Osaka (JP); Nobuya Yoshida, Toyota (JP); Kazumasa Kuze, Toyota (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 09/745,794

(22) Filed: Dec. 21, 2000

(65) Prior Publication Data

US 2001/0010413 A1 Aug. 2, 2001

(30) Foreign Application Priority Data

Feb. 1, 2000 (JP) .......................... 2000-024354

(51) Int. Cl.[7] ................................ F16F 13/00
(52) U.S. Cl. ........................ 267/140.13; 267/140.14
(58) Field of Search ............... 267/140.11, 140.13, 267/140.14, 140.15, 141

(56) References Cited

U.S. PATENT DOCUMENTS

| 4,660,812 A | 4/1987 | Dan et al. ............... 267/140.1 |
| 4,756,513 A | 7/1988 | Carlson et al. |
| 4,872,652 A | 10/1989 | Rohner et al. |
| 5,167,403 A | 12/1992 | Muramatsu et al. |
| 5,180,148 A | 1/1993 | Muramatsu et al. |
| 5,215,293 A | 6/1993 | Muramatsu et al. |
| 5,217,211 A | 6/1993 | Ide et al. |
| 5,246,212 A | 9/1993 | Funahashi et al. |
| 5,314,173 A | 5/1994 | Ide et al. |
| 5,344,127 A | 9/1994 | Hettler et al. .......... 267/140.13 |
| 5,462,261 A * | 10/1995 | Eckel et al. ............ 267/140.13 |
| 5,620,168 A | 4/1997 | Ohtake et al. |
| 5,628,498 A | 5/1997 | Nanno |
| 5,632,472 A | 5/1997 | Kato et al. |
| 5,642,873 A * | 7/1997 | Kato ........................ 267/140.14 |
| 5,769,402 A * | 6/1998 | Ide et al. ............... 267/140.14 |
| 5,848,782 A * | 12/1998 | Hein et al. ............. 267/140.11 |
| 5,911,412 A * | 6/1999 | Durand et al. ......... 267/140.13 |
| 6,131,894 A | 10/2000 | Satori et al. |
| 6,244,578 B1 * | 6/2001 | Schwerdt ............... 267/140.13 |
| 6,267,362 B1 * | 7/2001 | Satori et al. ........... 267/140.13 |

FOREIGN PATENT DOCUMENTS

| DE | 3933252 A1 * | 4/1991 | | |
| DE | 198 16 763 | 8/1999 | | |
| EP | 1 055 840 | 11/2000 | | |
| EP | 1055840 A2 * | 11/2000 | | |
| FR | 2 755 489 | 5/1998 | | |
| JP | 4272533 A * | 9/1992 | ............ | 267/140.14 |
| JP | 7310777 | 11/1995 | | |
| JP | 8-270718 | 10/1996 | | |
| JP | 9-196110 | 7/1997 | | |
| JP | 9-210118 | 8/1997 | | |
| JP | 9222148 | 8/1997 | | |
| JP | 10-184777 | 7/1998 | | |
| JP | 10-238586 | 9/1998 | | |
| JP | 11-230242 | 8/1999 | | |

* cited by examiner

Primary Examiner—Matthew C. Graham
Assistant Examiner—Melody M. Burch
(74) Attorney, Agent, or Firm—Jordan and Hamburg LLP (57) ABSTRACT

A switchable liquid-filled vibration absorbing mount has a stopper device interposed between a first diaphragm and a bottom portion for regulating downward movement of pushing member when a vacuum is introduced into a switching chamber, so that a protrusion of a valve member does not come out of an inner orifice when a vacuum is applied to the switching chamber to move the first diaphragm to a first position opening the orifice.

4 Claims, 5 Drawing Sheets

SWITCHABLE LIQUID-FILLED VIBRATION ABSORBING MOUNT

BACKGROUND OF THE INVENTION

The present invention relates to a Switchable Liquid-filled Vibration Absorbing Mount to be used for supporting a power unit of an automobile or another vibrating body in a vibration preventing manner.

In the prior art, the liquid-filled vibration absorbing mount has been used as a mount for bearing the vibrating body such as an automotive engine in a manner to transmit of vibration to the vehicular body.

As this liquid-filled vibration absorbing mount, there has been proposed (Japanese Patent Laid-Open or Unexamined Publication Nos. JP-A-1996-270718, JP-A-1998-238586 or JP-A-1998-184777, for example) which is switched for the vibration absorbing characteristics in accordance with two kinds of vibrations of different frequency ranges such as the shaking vibrations or the idle vibrations.

Figure 6:
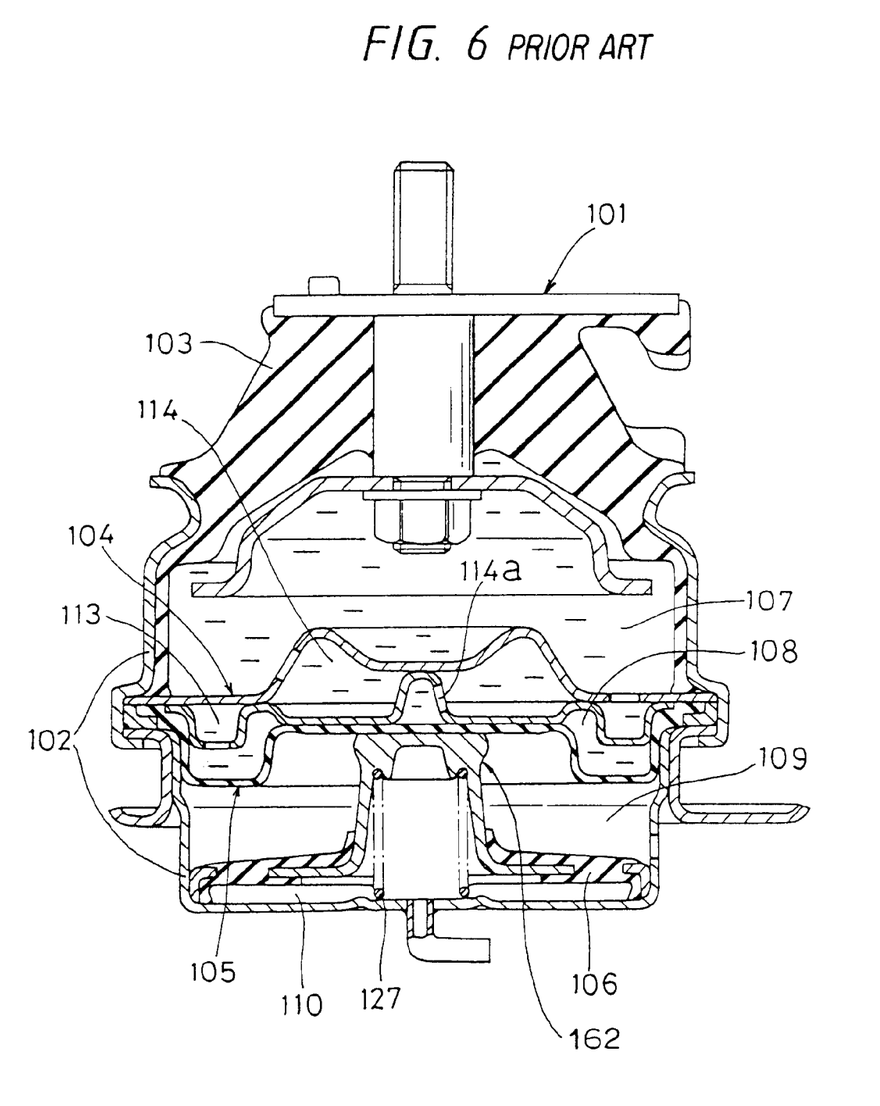
FIG. 6 is a longitudinal section showing the state in which the atmospheric pressure is introduced into the switching chamber of the switchable liquid-filled vibration absorbing mount of the prior art.

The switchable liquid-filled vibration absorbing mount of the prior art, as disclosed in Unexamined Published Japanese Patent Application No. JP-A-1996-270718, has the following construction, as shown in FIG. 6.

This vibration absorbing device is constructed to comprise: a first rigid mounting fixture (101); a second rigid mounting fixture (102) formed into a bottomed cylindrical shape having a bottom portion positioned at a predetermined distance in the axial direction from the first mounting fixture (101); a vibration absorbing base (103) made of a rubbery elastomer and interposed between the first mounting fixture (101) and the second mounting fixture (102) for jointing the two mounting fixtures (101) and (102); a partition member (104), a first diaphragm (105) and a second diaphragm (106) arranged in series in the axial direction between the vibration absorbing base (103) and the second mounting fixture (102); a main liquid chamber (107) formed between the vibration absorbing base (103) and the partition member (104); an auxiliary liquid chamber (108) formed between the partition member (104) and the first diaphragm (105); an outer orifice (113) and an inner orifice (114) disposed in the partition member (104) for providing a communication between the main liquid chamber (107) and the auxiliary liquid chamber (108), the outer orifice (113) being extended over a predetermined length in the circumferential direction of the partition member (104), the inner orifice (114) being disposed on the inner side of the outer orifice (113) in the diametrical direction and opened/closed by the first diaphragm (105); bias means (127) for pushing the first diaphragm (105) toward the partition member (104) so as to block the flow of the liquid between the inner orifice (114) and the auxiliary liquid chamber (108); a balance chamber (109) formed between the first diaphragm (105) and the second diaphragm (106); and a change-over chamber (110) formed between the second diaphragm (106) and the second mounting fixture (102) and capable of having the atmospheric pressure and a vacuum introduced selectively thereinto. When the vacuum is introduced into the change-over chamber (110), the first diaphragm (105) is moved against the biasing force of the bias means (127) to leave the partition member (104) thereby to provide the communication between the inner orifice (114) and the auxiliary liquid chamber (108). By switching the introductions of the atmospheric pressure and the vacuum into the change-over chamber (110) selectively, the inner orifice (114) can be opened/closed so that the orifices individually coping with the two kinds of vibrations in different frequency ranges can be selectively employed.

In this liquid-filled vibration absorbing mount of the prior art, not only the outer orifice (113) but also the inner orifice (114) to be opened/closed by the first diaphragm (105) is ring-shaped. Therefore, the inner orifice (114) has a certain length to extend in the circumferential direction so that a liquid to flow in the inner orifice (114) is subjected to a flow resistance. As a result, the liquid becomes hard to flow in the inner orifice (114). Thus, the liquid flows in the outer orifice (113) so that a sufficient vibration attenuating effect cannot be obtained in the inner orifice (114).

In order to close the inner orifice (114), on the other hand, the first diaphragm (105) is pushed at its central portion to the lower face of the partition member (104) through a push member (162) by the bias means (127). Specifically, the flat central portion of the first diaphragm (105) comes into abutment against the flat portion of the circumference of an opening (114a) of the inner orifice (114) on the side of the auxiliary liquid chamber (108) in the partition member (104) so that the inner orifice (114) is closed exclusively by such planar abutment. When a high pressure is abruptly built up in the main liquid chamber (107), for example, or when the first diaphragm (105) is transversely displaced or deformed by the rocking motions or the like to slacken the abutting portion slightly, therefore, the inner orifice (114) may not be sufficiently closed so that the stable vibration absorbing characteristics cannot be obtained.

SUMMARY OF THE INVENTION

The invention has been conceived in view of the description thus far made and contemplates to improve the aforementioned conventional liquid-filled vibration absorbing mount, in which the inner one of the two inner and outer orifices can be opened/closed to allow the orifices individually coping with the two vibrations of different frequency ranges such as the shaking vibrations and the idle vibrations to be selectively employed, especially the shape of the inner orifice and the shape of the first diaphragm for closing the inner orifice, thereby to solve the aforementioned problems, to exhibit the vibration attenuations effectively in the different frequency ranges and to hold the stable characteristics.

As in the aforementioned liquid-filled vibration absorbing mount, according to the invention, there is provided a switchable liquid-filled vibration absorbing mount comprising: a first mounting fixture; a second mounting fixture formed into a bottomed cylindrical shape; a vibration absorbing base jointing the two mounting fixtures; a partition member, a first diaphragm and a second diaphragm arranged in series between the second mounting fixture and the vibration absorbing base; a main liquid chamber and an auxiliary liquid chamber partitioned by the partition member; two outer and inner orifices and an inner diaphragm disposed for providing a communication between the two chambers; bias means for pushing the first diaphragm toward the partition member; a balance chamber formed between the first diaphragm and the second diaphragm; and a switching chamber formed between the second diaphragm and the second mounting fixture, wherein the improvement resides: in that the inner orifice is an opening extending in the axial direction through the partition member; in that the first diaphragm is provided at its central portion with a valve member for closing the inner orifice, the valve member including: a flat rubber face confronting the lower face of the circumference of the inner orifice in the partition member when the atmospheric pressure is introduced into the change-over chamber, and a protrusion protruding from the flat rubber face and fitted in the inner orifice; and in that by selecting the introduction of either the atmospheric pressure or the vacuum into the switching chamber, the valve member is moved up and down to open/close the opening, and the transverse displacement of the valve member is regulated by the protrusion.

According to this switchable liquid-filled vibration absorbing mount, when the atmospheric pressure is introduced into the switching chamber, the flat rubber face of the valve member belonging to the first diaphragm is biased by the bias means to confront the lower face of the circumference of the inner orifice thereby to hold the inner orifice in the closed state so that the vibration attenuations in the frequency range set for the outer orifice can be effected.

By introducing the vacuum into the switching chamber, moreover, the valve member is caused to leave the partition member (4) against the biasing force of the bias means thereby to open the inner orifice into its active state so that the vibration attenuations in the frequency range set for the inner orifice are effected while suppressing the liquid flow in the outer orifice.

Since the protrusion of the valve member is fitted in the opening, on the other hand, the valve member can be prevented from being transversely displaced or going out of position, and the flat rubber face can confront the lower face of the circumference of the inner orifice of the partition member thereby to prevent the closed state from being slackened, as might otherwise be caused by the displacement of the inner orifice, to retain the sufficient closed state and to warrant the stable characteristics for a long time.

On the other hand, the second diaphragm preferably includes: an annular rubber portion fitted at its outer circumference in the inner circumference of the second mounting fixture; and a pushing auxiliary member jointed to the inner circumferential edge portion of the rubber portion for pushing the flat rubber face from the side of the balance chamber onto the partition member thereby to move the valve member up and down through the pushing auxiliary member. As a result, the valve member can be stably supported by the second diaphragm through the pushing auxiliary member so that the inner orifice can be satisfactorily opened/closed by the valve member.

The aforementioned liquid-filled vibration absorbing mount is especially preferable to further comprise stopper means for regulating the downward movement of the pushing auxiliary member when the vacuum is introduced into the switching chamber, so that the protrusion of the valve member may not come out of the inner orifice at the time of introducing the vacuum into the switching chamber.

As a result, even when the vacuum is introduced into the switching chamber to open the inner orifice, the protrusion is held in the inner orifice, and the valve member can be positioned to confront the inner orifice without being transversely displaced or going out of position, so that the opening/closing actions can be performed satisfactorily stably at all times.

The stopper means preferably includes a stopper portion made of rubber integrally with the rubber portion and disposed at the lower end portion of the pushing auxiliary member of the second diaphragm, so that the stopper portion may come into abutment against the bottom portion of the second mounting fixture at the time of introducing the vacuum into the switching chamber, thereby to regulate the downward movement of the pushing auxiliary member. As a result, the aforementioned stopper action is performed reliably and satisfactorily.

The second diaphragm is preferred to have its rubber portion vulcanized and shaped so that it may take a shape between the shape at the time of introducing the atmospheric pressure into the switching chamber and the shape at the vacuum introducing time. As a result, the change in the shape of the rubber portion, as caused by switching the opening/closing actions of the inner orifice can be minimized to improve the durability of the rubber portion.

The protrusion of the valve member is preferably tapered to converge and to have a root diameter substantially equal to or slightly smaller than the internal diameter of the inner orifice. With this shape, more specifically, the protrusion performs a guide action while the valve member is moving upward to close, even if it grows slightly eccentric to or inclined from the inner orifice being opened. Thus, the valve member can confront the partition member at a position substantially coaxial with the inner orifice, thereby to close the inner orifice reliably.

The second mounting fixture can include: a cylindrical fixture vulcanized and adhered at its upper portion to the vibration absorbing base; and a bottom cylinder fixture having a bottom portion and caulked and fixed to the lower end portion of the cylindrical fixture. The second diaphragm is attached by press-fitting the outer circumference of the rubber portion including a reinforcing ring-shaped fixture in the cylindrical portion of the bottom cylinder member. Moreover, the partition member and the first diaphragm are individually caulked and fixed at their outer circumferential edge portions to the caulked and fixed portions between the cylindrical fixture and the bottom cylinder fixture.

As a result, it is possible to provide a product which can be easily assembled and which can retain a high reliability even for the loading liquid pressure after mounted.

The switchable liquid-filled vibration absorbing mount can further comprise a boss fixture mounted in the bottom portion of the second mounting fixture and having a vacuum and atmospheric pressure introducing tube extending therethrough. The bias means is interposed between the boss fixture and the pushing auxiliary member and positioned by the boss fixture. As a result, the bias means can be stably held.

DETAILED DESCRIPTION OF THE PREFERRED EMBODIMENTS

Here will be described a preferred embodiment of the liquid-filled vibration absorbing mount of the invention with reference to the accompanying drawings.

A switchable liquid-filled vibration absorbing mount of the embodiment, as shown in FIGS. 1 to 4, is constructed to include: a first mounting fixture (1); a bottomed second mounting fixture (2) having a bottom positioned at a predetermined spacing in the axial direction from the first mounting fixture (1); and a thick vibration absorbing base (3) made of an elastic material and interposed between those first mounting fixture (1) and second mounting fixture (2) for connecting the two mounting fixtures (1) and (2).

Figure 1:
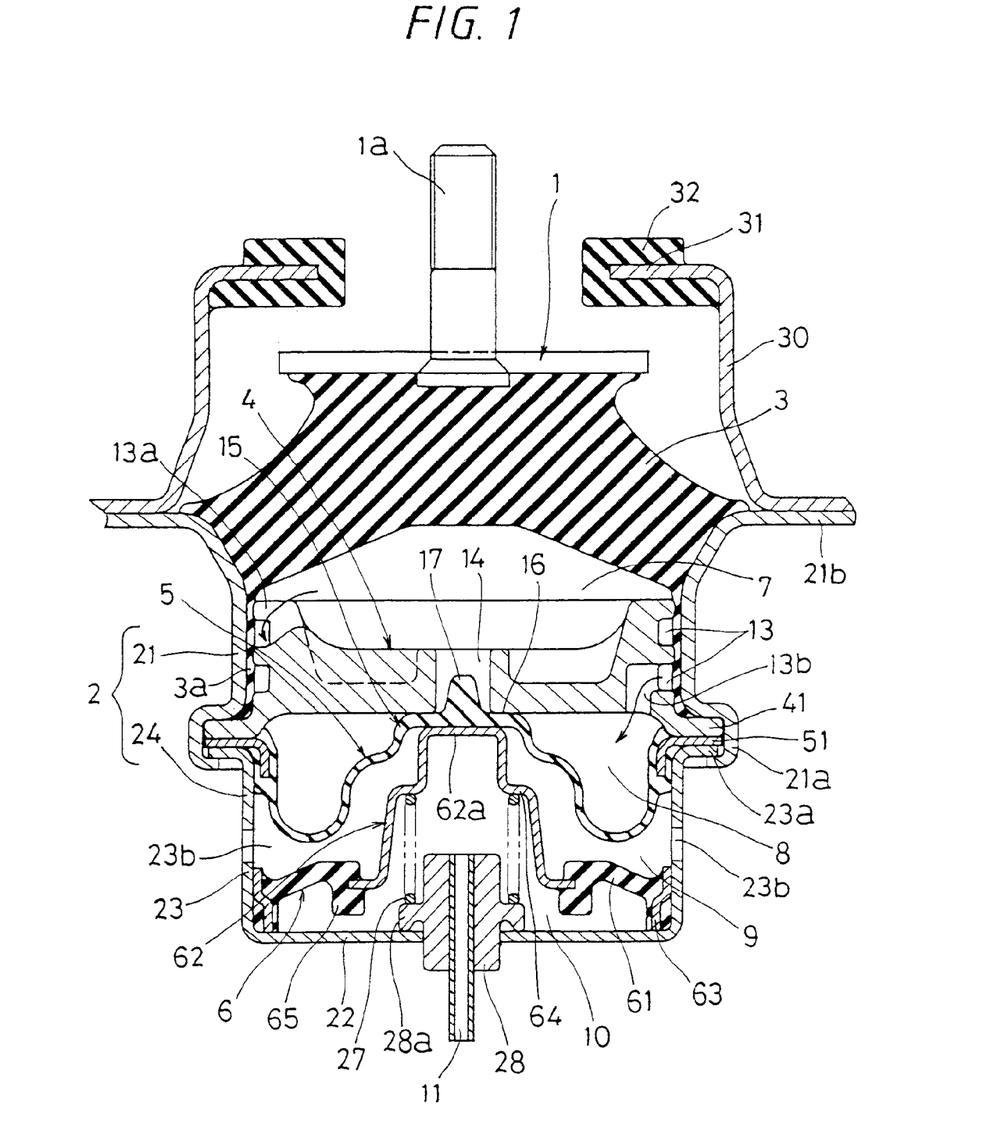
FIG. 1 is a longitudinal section showing the state in which an atmospheric pressure is introduced into the switching chamber of a switchable liquid-filled vibration absorbing mount of one embodiment of the invention.

The first mounting fixture (1) is made mainly of a rigid material such as a metallic material and formed generally into a disc shape. From the central portion of the first mounting fixture (1), there is protruded a mounting bolt (1a). By this mounting bolt (1a), the first mounting fixture (1) is mounted on a vibrating body, as exemplified mainly by a power unit such as an automotive engine.

The second mounting fixture (2) is also made mainly of a rigid material such as a metallic material and formed into a bottomed cylindrical shape. In the shown embodiment, the second mounting fixture (2) is composed of a cylindrical fixture (21) vulcanized and adhered at its upper portion to the vibration absorbing base (3), and a bottom cylinder fixture (24) having a bottom portion (22) and a cylindrical trunk portion (23). The trunk portion (23) of the bottom cylinder fixture (24) is caulked and fixed at its flanged upper end portion (23a) to the lower end portion (21a) of the cylindrical fixture (21). This second mounting fixture (2) is mounted mainly on the body side by the (not-shown) bracket which is attached to the outer circumference of the cylindrical fixture (21) and/or the trunk portion (23) of the bottom cylinder fixture (24).

The vibration absorbing base (3) is formed into a curved shape generally of an umbrella, as shown, and the first mounting fixture (1) is jointed to the upper portion of the vibration absorbing base (3) by vulcanizing/fixing means. To the outer circumference of the lower portion of the vibration absorbing base (3), on the other hand, there is vulcanized and fixed the upper portion of the cylindrical fixture (21) of the second mounting fixture (2).

In the space between the vibration absorbing base (3) and the bottom portion (22) of the second mounting fixture (2), there are arranged in series in the axial direction a partition member (4), and a first diaphragm (5) and a second diaphragm (6) made of a rubber film, sequentially from the side of the vibration absorbing base (3). And, the space between the vibration absorbing base (3) and the partition member (4) is formed as a main liquid chamber (7) which is filled with a liquid, and the space between the partition member (4) and the first diaphragm (5) is formed as an auxiliary liquid chamber (8) which has communication with the main liquid chamber (7) through a later-described orifice.

Moreover, the space between the first diaphragm (5) and the second diaphragm (6) is provided for a balance chamber (9) which is released to the atmosphere via an air vent (23b) formed in the trunk portion (23) of the bottom cylinder fixture (24) of the second mounting fixture (2). On the other hand, the space between the second diaphragm (6) and the bottom portion (22) of the second mounting fixture (2) is provided for a switching chamber (10), into which the atmospheric pressure and the vacuum can be selectively introduced, as will be described in the following. Specifically, this switching chamber (10) is switched into the atmospheric pressure introduction state and the vacuum introduction state to change its volume by an external switching valve (although not shown) via a switching communicating tube (11). On the other hand, the balance chamber (9) has an action to reduce the pressure difference between the auxiliary liquid chamber (8) and the switching chamber (10). This action can contribute to the durability of the diaphragms (5) and (6) thereby to make a control to introduce a low vacuum force to the switching chamber (10). Here, the balance chamber (9) could be provided for a sealed chamber.

Figure 3:
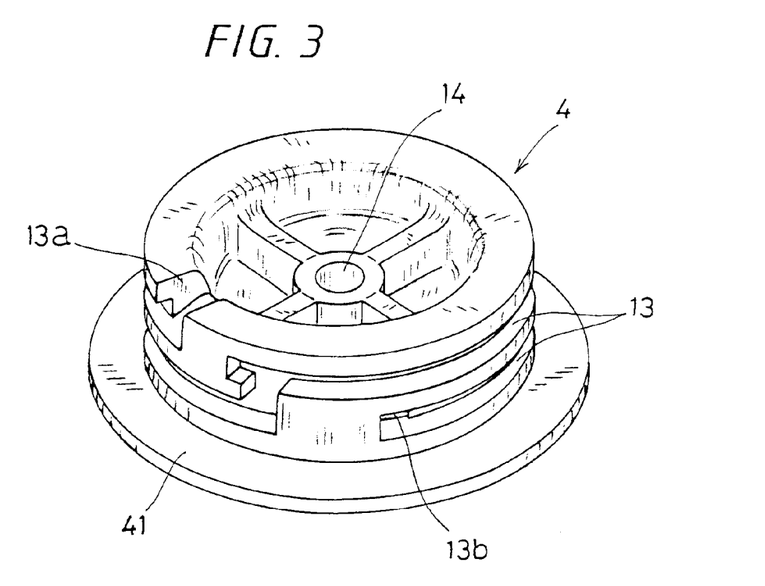
FIG. 3 is a perspective view of a partition member.

The partition member (4) is molded of a metallic material such as aluminum, a synthetic resin material or another rigid material, and is provided along its outer circumference with a circumferentially extending grooves for forming an outer orifice (13) and at its central portion with an opening acting as an inner orifice (14), as shown in FIG. 3. In this shown case, the outer circumferential groove has a length of about two turns. And, the partition member (4) is fitted gaslight in the inner circumference of the lower opening side of the cylindrical fixture (21) of the second mounting fixture (2) through a sealing rubber portion 3a integral with the vibration absorbing base (3), so that the aforementioned groove forms the passage as the outer orifice (13) extended circumferentially, as seen in a top plan view. This outer orifice (13) has communications with the main liquid chamber (7) and the auxiliary liquid chamber (8), respectively, through communicating portions (13a) and (13b) which are formed in the upper edge side and lower edge side of that groove.

The partition member (4) is extended outward at its lower circumferential edge (41), which is caulked and fixed integrally with an annular collar fixture (51), as vulcanized and fixed on the outer circumference of the first diaphragm (5), at the caulked portion between the cylindrical fixture (21) and the bottom cylinder fixture (24) of the second mounting fixture (2). Over the flanged upper end portion (23a) of the bottom cylinder fixture (24), more specifically, there are laid the collar fixture (51) and the lower circumferential edge (41) of the partition member (4), which are caulked and fixed with the lower end portion (21a) of the cylindrical fixture (21). The collar fixture (51) has an approximately L shaped a half cross-section as shown, and the collar fixture (51) is partially fitted and held gaslight in the trunk portion (21) of the bottom cylinder fixture (24) through a sealing rubber portion integral with the rubber film portion of the first diaphragm (5). This sealing rubber portion also acts as a seal for the portion jointed to the partition member (4).

On the other hand, the inner orifice (14), as formed of an opening at the central portion of the partition member (4), also communicates with both the main liquid chamber (7) and the auxiliary liquid chamber (8), and is opened/closed especially by a valve member (15) located at the central portion of the first diaphragm (5). At the central portion of the first diaphragm (5), more specifically, there is formed the valve member (15) which is made coaxially with the inner orifice (14) formed as the aforementioned opening, to close the inner orifice (14). This valve member (15) is provided, as shown, with not only a rather thickened flat rubber face (16) to abut against the lower face of the partition member (4) around the inner orifice (14) but also a transverse slip preventing protrusion (17) formed at the central portion of the flat rubber face (16) and fitted in the inner orifice (14). The valve member (15) can move up and down to open/close the inner orifice (14) with its protrusion (17) being fitted in the opening acting as the inner orifice (14). On the other hand, the flat rubber face (16) is formed to have such a diameter as can confront the partition member (4) without being short of the circumference of the inner orifice (14) even when the protrusion (17) becomes slightly eccentric in the inner orifice (14).

Figure 2:
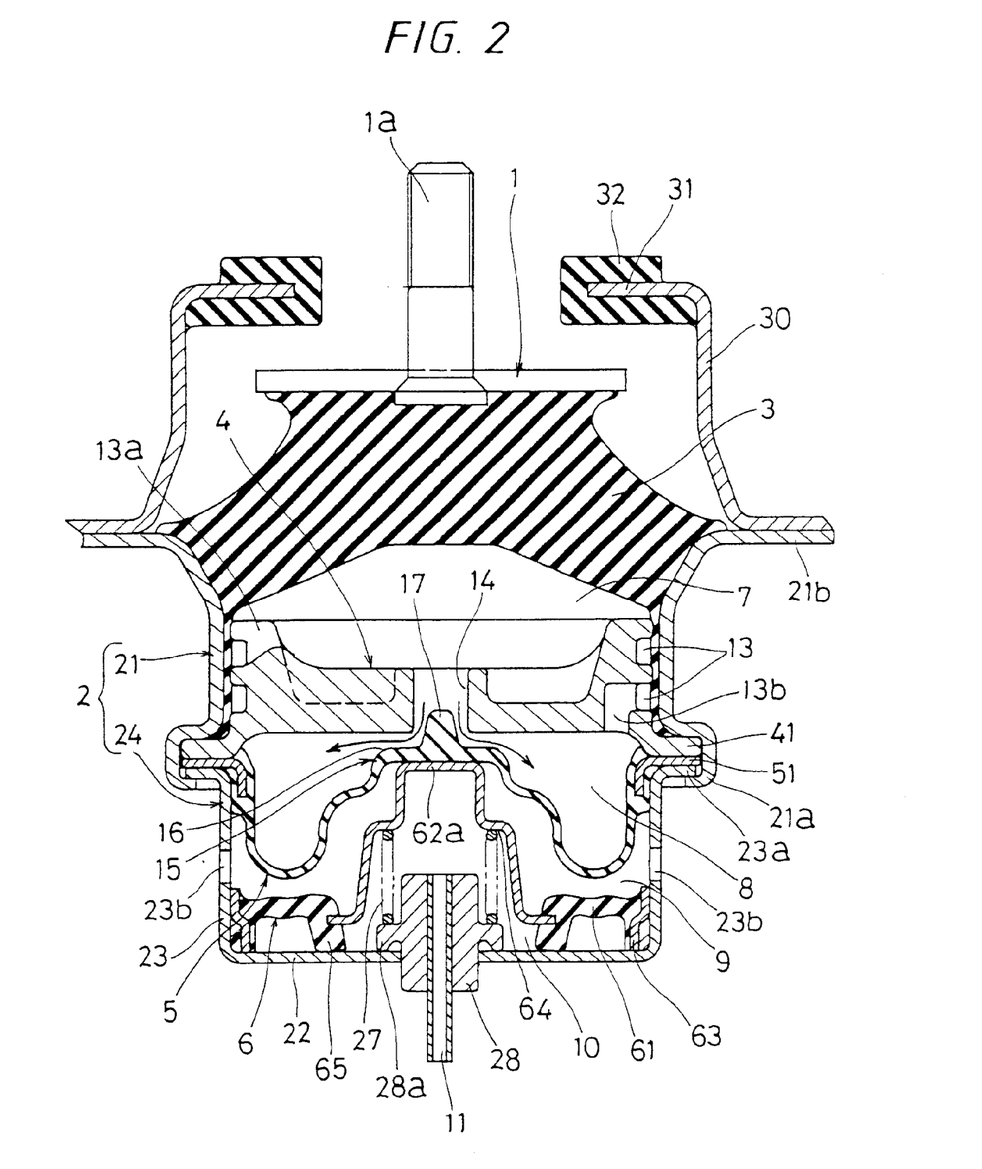
FIG. 2 is a longitudinal section showing the state in which a vacuum pressure is introduced into the switching chamber of the same device.

The valve member (15) is so restrained in a downward displacement more than a predetermined stroke by the later-described stopper means that at least the leading end side of the protrusion (17) may be positioned in the inner orifice (14) or may not go out of the inner orifice (14) even when the vacuum is introduced into the switching chamber (10).

The protrusion (17) of the valve member (15) may take any shape if it is so fitted in the inner orifice (14) as to move up and down. As shown, however, the protrusion (17) is preferably tapered to converge and to have a root diameter substantially equal or slightly smaller than the internal diameter of the inner orifice (14). Then, the protrusion (17) performs a guide action while the valve member (15) is moving upward to close, even if it grows slightly eccentric to or inclined from the inner orifice (14) being opened. Although not shown, inclined ribs could be formed on the outer circumference of the protrusion (17) to perform the guide action.

Here, the outer orifice (13) and the inner orifice (14) are set to have such sectional areas and lengths, respectively, as to exhibit the vibration absorbing action effectively in the frequency range of the shaking vibrations and as to exhibit the vibration absorbing action effectively in the frequency range of the idle vibrations when in the open state. Specifically, the outer orifice (13) is formed either to have a longer passage or to have a smaller area of its passage in the axial section of the vibration absorbing device than that of the inner orifice (14).

Figure 4:
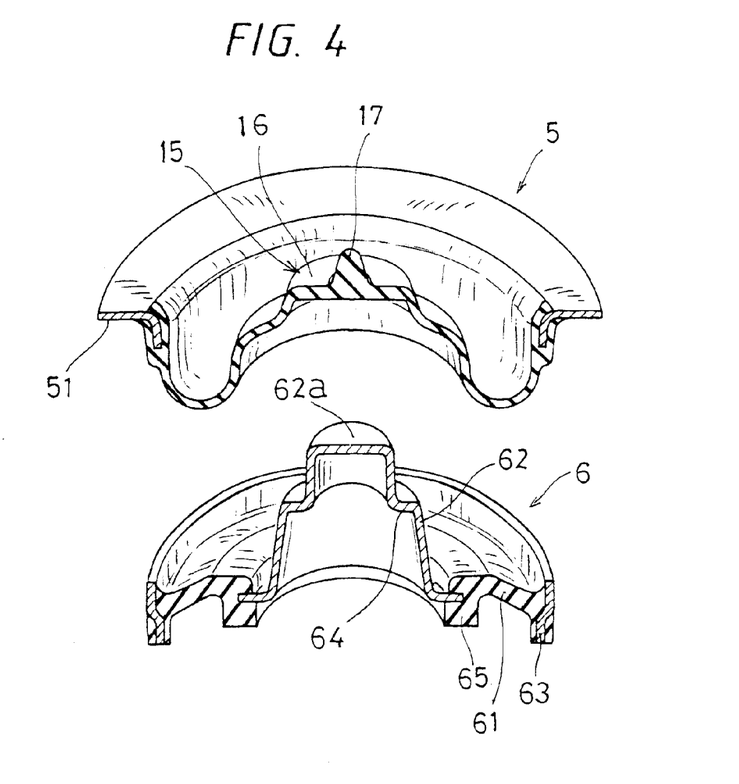
FIG. 4 is a sectional perspective view showing one half with a first diaphragm and a second diaphragm being separated.

On the other hand, the second diaphragm (6) is provided with: a slightly thicker annular rubber portion (61) than the rubber film of the first diaphragm (5); and a pushing auxiliary member (62) having a generally cap-shaped section merging into the inner circumferential edge portion of the rubber portion (61) for pushing the flat rubber face (16) of the valve member (15) from the side of the balance chamber (9) to the partition member (4), so that the valve member (15) may be brought up and down through the pushing auxiliary member (62).

This pushing auxiliary member (62) confronts the lower face of the flat rubber face (16) at its upper end portion (62a) so that the flat rubber face (16) can abut stably against the partition member (4). On the other hand, the pushing auxiliary member (62) holds a constant spacing between the valve member (15) and the second diaphragm (6) and forms part of the partition between the balance chamber (9) and the switching chamber (10).

The second diaphragm (6) has a cylindrical ring-shaped fixture (63) vulcanized and adhered to the outer circumference thereof, and the outer circumference of the ring-shaped fixture (63) is so press-fitted and fixed in the lower end portion of the trunk portion (23) of the bottom cylinder fixture (24) of the second mounting fixture (2) as to keep the gaslight state. This press-fitting is performed so far as to caulk and fix the cylindrical fixture (21) of the second mounting fixture (2) and the bottom cylinder fixture (24). Inside of the pushing auxiliary member (62) in the switching chamber (10), there is disposed bias means (27) which is exemplified by a spring for pushing the valve member (15) at the central portion of the first diaphragm (5) toward the partition member (4) through the pushing auxiliary member (62). In the shown case, the bias means (27) is interposed between a step portion (64) of the pushing auxiliary member (62) and the bottom portion (22) of the second mounting fixture (2). When the atmospheric pressure is introduced into the switching chamber (10), therefore, the valve member (15) can be pushed onto the partition member (4) by the biasing force of the bias means (27) thereby to block the liquid flow through the inner orifice (14). When the vacuum is introduced into the switching chamber (10), on the other hand, the valve member (15) is brought downward apart from the partition member (4) against the biasing force of the bias means (27) so that the inner orifice (14) is opened to provide the communication between the main liquid chamber (7) and the auxiliary liquid chamber (8).

In short, the lower position of the valve member (15) is determined by the pressure at the time of introducing the vacuum into the switching chamber (10) and by the spring constant of the bias means (27). Therefore, this bias means (27) to be used is ordinarily exemplified by one having such a spring constant as will be compressed (or warped) together with the valve member (15) toward the bottom portion (22) by the introduction of the vacuum into the switching chamber (10) while restraining the first diaphragm (5) through the pushing auxiliary member (62).

The bias means (27) could be arranged over the bottom portion (22) of the second mounting fixture (2) but is positioned by a boss fixture (28), as mounted in the central portion of the bottom portion (22) by press-fit means, and is supported between the boss fixture (28) and the pushing auxiliary member (62). Numeral (28a) designates a positioning flange belonging to the boss fixture (28). Through this boss fixture (28), there is extended gaslight by the press-fit means the change-over communicating tube (11) for introducing the atmospheric pressure and the vacuum into the switching chamber (10).

The second diaphragm (6) is provided at the lower end portion of the pushing auxiliary member (62) with stopper portion (65) made of rubber integrally with the rubber portion (61), as the stopper means for regulating the downward movement of the pushing auxiliary member (62) at the time of introducing the vacuum into the switching chamber (10). At this vacuum introducing time, the stopper portion (65) comes into abutment against the bottom portion (22) of the second mounting fixture (2) to regulate the downward movement of the pushing auxiliary member (62) so that the protrusion (17) of the valve member (15) may not come out of the inner orifice (14).

On the other hand, the second diaphragm (6) is molded by vulcanizing the rubber portion (61) to take an intermediate shape between the shape of FIG. 1, in which the atmospheric pressure is introduced into the switching chamber (10), and the shape of FIG. 2 in which the vacuum is introduced into the switching chamber (10), so that the change in the shape of the rubber portion (61) due to the change-over of the introductions of the atmospheric pressure and the vacuum into the switching chamber (10) may be minimized.

In the lower face of the stopper portion (65), there may preferably be formed slits (although not shown) for preventing the stopper portion (65) from being hammered and sucked. The rubber of the stopper portion (65) is enabled by setting its height or the like to determine the stroke of the vertical movements of the valve member (15) precisely and to improve the durability of the second diaphragm (6). Here, the stopper means also be practiced by disposing it on the bottom portion (22) or on the side of the boss fixture (28) for regulating the downward movement of the pushing auxiliary member (62).

To the flanged upper end portion (21b) of the cylindrical fixture (21) of the second mounting fixture (2), as fixed to the vibration absorbing base (3), moreover, there is fixed by welding means or the like a cylindrical stopper fixture (30)

which encloses the vibration absorbing base (3). This stopper fixture (30) is bent at its upper end portion (31) in an inward flanged shape over the first mounting fixture (1) so that it is formed into a stopper portion for a large displacement to regulate a large relative displacement between the first mounting fixture (1) and the second mounting fixture (2). To the upper and lower faces of the aforementioned stopper portion, there is vulcanized and adhered a rebounding/bounding annular stopper rubber (32) which comes into abutment against the (not-shown) bracket on the vibrating body or the first mounting fixture (1) at the time of a large displacement.

Figure 5:
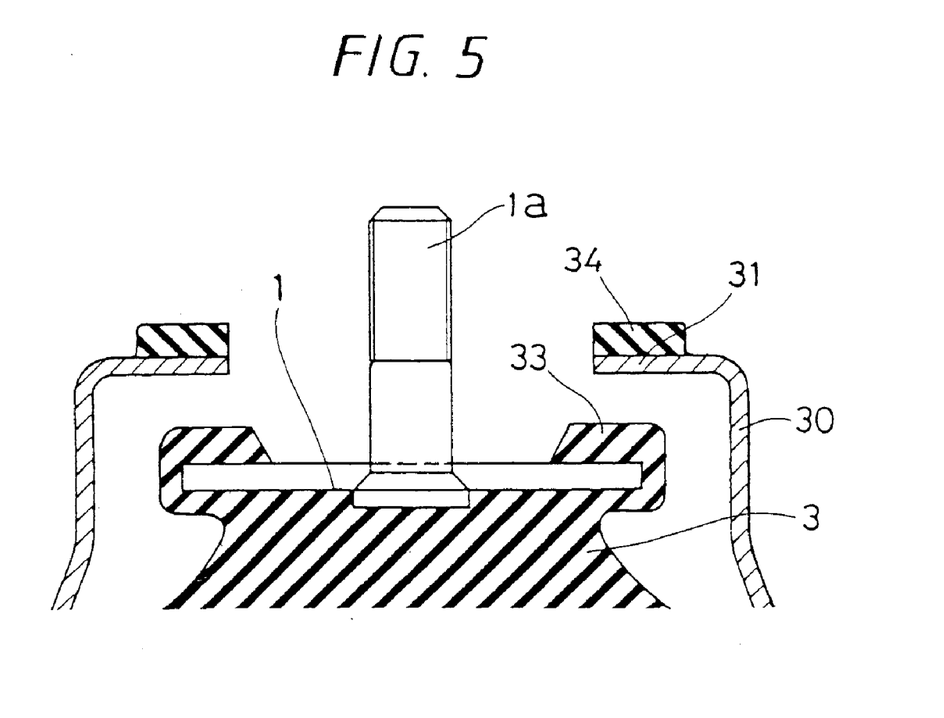
FIG. 5 is a section showing one portion of a modification of a stopper portion for a large displacement.

The stopper portion could also be practiced, as shown in FIG. 5, by vulcanizing and adhering a rebounding annular stopper rubber (33), as can abut against the lower face of the upper end portion (31) of the stopper fixture (30), integrally with the vibration absorbing base (3) to the upper face of the first mounting fixture (1) and by attaching a bounding stopper rubber (34) to the upper face of that upper end portion (31).

Here, the bottom cylinder fixture (24) of the second mounting fixture (2) is provided with a plurality of water vents for the assembling purpose. These water vents are sufficient if at least one is formed in the lowermost end in the mounted state whereas the other may take any position, and may have such a small diameter as to make it hard to admit muddy water. These water vents could also be exemplified by the air vent (23b) of the balance chamber (9).

In the change-over liquid-filled type vibration absorbing device thus constructed, the vibration absorbing base (3) is deformed by the vibrations applied from the side of the vibrating body such as the power unit. This deformation causes the liquid in the main liquid chamber (7) to flow into and out of the auxiliary liquid chamber (8) through either the outer orifice (13) formed in the partition member (4) or the inner orifice (14) of the opening. Then, the vibrations are drastically attenuated by the individual resonating characteristics of the outer orifice (13) and the inner orifice (14).

FIG. 1 shows the state in which the atmospheric pressure is introduced into the switching chamber (10) via the switching communicating tube (11). In this state, the valve member (15) at the central portion of the first diaphragm (5) is pushed by the biasing force of the bias means (27) toward the partition member (4) through the pushing auxiliary member (62) so that its protrusion (17) is fitted in the inner orifice (14) acting as the opening. As a result, the flat rubber face (16) is abuts against the lower face of the circumferential portion of the inner orifice (14) of the partition member (4) to close the inner orifice (14). In other words, no fluid flows through the inner orifice (14). As a result, the fluid flows between the main liquid chamber (7) and the auxiliary liquid chamber (8) through the annular outer orifice (13). Thus, it is possible to attenuate the vibrations such as the shaking vibrations effectively in the frequency range in which the attenuations can be effected by the outer orifice (13).

On the other hand, FIG. 2 shows the state in which the vacuum is introduced into the switching chamber (10) so as to cope with the idle vibrations. In this case, the switching chamber (10) is evacuated so that the second diaphragm (6) is sucked together with the pushing auxiliary member (62) toward the bottom portion (22) of the second mounting fixture (2). Accordingly with this, the second diaphragm (6) is moved downward together with the valve member (15) against the biasing force of the bias means (27) so that the flat rubber face (16) leaves the lower face of the partition member (4) to retain the clearance between the valve member (15) and the partition member (4) so that the inner orifice (14) is opened with respect to the auxiliary liquid chamber (8) to provide the communication between the main liquid chamber (7) and the auxiliary liquid chamber (8).

At this time, the inner orifice (14) has a larger sectional area and a shorter length of the liquid flow than those of the outer orifice (13) so that the liquid flows not through the outer orifice (13) but through the inner orifice (14) thereby to attenuate the vibrations, i.e., the idle vibrations effectively in the frequency range in which the attenuations are made effective by the inner orifice (14). Especially, the one relatively large opening is formed as the inner orifice (14) and is opened/closed by the valve member (15). Unlike the annular orifice of the prior art having a considerable length, therefore, the inner orifice of the drastically large size and the short flow passage can be set to make the vibration attenuations more effective.

Moreover, the protrusion (17) of the valve member (15) is fitted in the inner orifice (14) so that the valve member (15) can be prevented from being transversely dislocated or going out of position. Even when the atmospheric pressure is then introduced into the switching chamber (10) to bring the valve member (15) into abutment against the partition member (4), the flat rubber face (16) of the valve member (15) can confront the lower face of the circumferential portion of the inner orifice (14) of the partition member (4) uniformly without any dislocation thereby to prevent the closed face from being slackened by the dislocation, to retain the sufficient closed state and to retain the stable characteristics for a long time.

In the switchable liquid-filled vibration absorbing mount thus far described according to the invention, of the two inner and outer orifices, the inner one can be opened/closed to employ the orifices coping with the shaking vibrations and the idle vibrations selectively. The inner orifice is formed of the opening so that it can be opened/closed by the valve member having the protrusion with this protrusion being fitted therein or in that opening. Without any trouble of slackening the close face due to the displacement, therefore, the sufficient closed state can be retained to hold the stable characteristics for a long time.

What is claimed is:

1. A switchable liquid-filled vibration absorbing mount comprising:

a first rigid mounting fixture;

a second rigid mounting fixture having a cylindrical shape and a bottom portion positioned at a predetermined distance in an axial direction from said first rigid mounting fixture;

a vibration absorbing base made of a rubbery elastomer and interposed between said first rigid mounting fixture and said second rigid mounting fixture for joining the first and second rigid mounting fixtures;

a partition member, a first diaphragm and a second diaphragm arranged in series in the axial direction from said vibration absorbing base and said second rigid mounting fixture in a space defined between said vibration absorbing base and said second rigid mounting fixture;

a main liquid chamber defined between said vibration absorbing base and said partition member;

an auxiliary liquid chamber defined between said partition member and said first diaphragm;

said partition member defining an outer orifice for providing communication between said main liquid chamber and said auxiliary liquid chamber for damping vibrations in a first frequency range, said outer orifice extending a predetermined length in a circumference of said partition member;

said partition member defining an inner orifice extending in the axial direction for providing communication between said main liquid chamber and said auxiliary liquid chamber for damping vibrations in a second frequency range, said partition member having a lower face portion extending about a perimeter of the inner orifice;

bias means for pushing said first diaphragm against said partition member so as to block flow of liquid between said inner orifice and said auxiliary liquid chamber;

a balance chamber defined between said first diaphragm and said second diaphragm;

a switching chamber, defined between said second diaphragm and said second rigid mounting fixture, capable of having atmospheric pressure and a vacuum introduced selectively thereinto, wherein, by introducing the vacuum into said switching chamber, said first diaphragm is caused to leave said partition member against biasing force of said bias means thereby to move to a first position opening said inner orifice, and by introducing the atmospheric pressure into said switching chamber, said first diaphragm is caused to move against said partition member to a second position closing said inner orifice, said first diaphragm being provided at a central portion thereof with a valve member for closing said inner orifice, said valve member including:
  a flat rubber face confronting the lower face of the partition member surrounding the circumference of said inner orifice when the atmospheric pressure is introduced into said switching chamber, and
  a protrusion protruding from said flat rubber face and fitted in said inner orifice to regulate transverse displacement of said valve member when said first diaphragm is in said first position and when said first diaphragm is in said second position, said second diaphragm including:
  an annular rubber portion having an outer circumference fitted in an inner circumference of said second mounting fixture; and
  a pushing auxiliary member joined to an inner circumferential edge portion of said annular rubber portion for pushing the flat rubber face onto said partition member and moving said valve member up and down by way of said pushing auxiliary member;

stopper means interposed between said first diaphragm and said bottom portion for regulating the downward movement of said pushing auxiliary member when the vacuum is introduced into said switching chamber, so that the protrusion of said valve member may not come out of said inner orifice at the time of introducing the vacuum into said switching chamber to move said first diaphragm to said first position;

said stopper means including a stopper portion made of rubber integrally with said annular rubber portion and disposed at a lower end portion of said pushing auxiliary member of said second diaphragm, so that said stopper portion may come into abutment against the bottom portion of said second rigid mounting fixture at a time of introducing the vacuum into said switching chamber, thereby to regulate the downward movement of said pushing auxiliary member; and a boss fixture mounted in the bottom portion of said second rigid mounting fixture and having a vacuum and atmospheric pressure introducing tube extending therethrough, wherein said bias means is interposed between said boss fixture and said pushing auxiliary member and positioned by said boss fixture.

2. A switchable liquid-filled vibration absorbing mount comprising:

a first rigid mounting fixture;

a second rigid mounting fixture having a cylindrical shape and a bottom portion positioned at a predetermined distance in an axial direction from said first rigid mounting fixture;

a vibration absorbing base made of a rubbery elastomer and interposed between said first rigid mounting fixture and said second rigid mounting fixture for joining the first and second rigid mounting fixtures;

a partition member, a first diaphragm and a second diaphragm arranged in series in the axial direction from said vibration absorbing base and said second rigid mounting fixture in a space defined between said vibration absorbing base and said second rigid mounting fixture;

a main liquid chamber defined between said vibration absorbing base and said partition member;

an auxiliary liquid chamber defined between said partition member and said first diaphragm;

said partition member defining an outer orifice for providing communication between said main liquid chamber and said auxiliary liquid chamber for damping vibrations in a first frequency range, said outer orifice extending a predetermined length in a circumference of said partition member;

said partition member defining an inner orifice extending in the axial direction for providing communication between said main liquid chamber and said auxiliary liquid chamber for damping vibrations in a second frequency range, said partition member having a lower face portion extending about a perimeter of the inner orifice;

bias means for pushing said first diaphragm against said partition member so as to block flow of liquid between said inner orifice and said auxiliary liquid chamber;

a balance chamber defired between said first diaphragm and said second diaphragm;

a switching chamber, defined between said second diaphragm and said second rigid mounting fixture, capable of having atmospheric pressure and a vacuum introduced selectively thereinto, said first diaphragm and said second diaphragm coupled such that, by introducing the vacuum into said switching chamber, said first diaphragm is caused to leave said partition member against biasing force of said bias means thereby to move to a first position opening said inner orifice, and by introducing the atmospheric pressure into said switching chamber, said first diaphragm is caused to move against said partition member to a second position closing said inner orifice, said first diaphragm being provided at a central portion thereof with a valve member for closing said inner orifice, said valve member including:
  a flat rubber face confronting the lower face of the partition member surrounding the circumference of said inner orifice when the atmospheric pressure is introduced into said switching chamber, and a protrusion protruding from said flat rubber face and fitted in said inner orifice to regulate transverse displacement of said valve member when said first diaphragm is in said first position and when said first diaphragm is in said second position;

said second diaphragm having an annular rubber portion vulcanized and shaped to have an unbiased shape between a shape at a time of introducing the atmospheric pressure into said switching chamber and a shape at a time of introducing the vacuum pressure into said switching chamber;

second diaphragm including:
  said annular rubber portion having an outer circumference fitted in an inner circumference of said second rigid mounting fixture; and
  a pushing auxiliary member joined to an inner circumferential edge portion of said annular rubber portion for pushing the flat rubber face from the side of said balance chamber onto said partition member thereby to move said valve member up by way of said pushing auxiliary member;

a boss fixture mounted in the bottom portion of said second rigid mounting fixture and having a vacuum and atmospheric pressure introducing tube extending therethrough; and said bias means being interposed between said boss fixture and said pushing auxiliary member and positioned by said boss fixture.

3. A switchable liquid-filled vibration absorbing mount according to any one of claims 1 and 2,
  wherein the protrusion of said valve member is tapered to converge and to have a root diameter substantially equal to or slightly smaller than an internal diameter of said inner orifice.

4. A switchable liquid-filled vibration absorbing mount according to any one of claims 1 and 2, wherein said second rigid mounting fixture includes:
  a cylindrical fixture vulcanized and adhered at an upper portion thereof to said vibration absorbing base; and
  a bottom cylinder fixture having the bottom portion and an upper portion caulked and fixed to a lower end portion of said cylindrical fixture,
  wherein said second diaphragm is attached by press-fitting the outer circumference of said annular rubber portion including a reinforcing ring-shaped fixture in a cylindrical portion of said bottom cylinder fixture, and
  wherein said partition member and said first diaphragm are individually caulked and fixed at their outer circumferential edge portions between said lower end portion of said cylindrical fixture and said upper portion of said bottom cylinder fixture.

* * * * *